United States Patent [19]

Holmér

[11] Patent Number: 4,815,423

[45] Date of Patent: Mar. 28, 1989

[54] METHOD FOR CONTROLLING THE WORKING CYCLE OF AN INTERNAL COMBUSTION ENGINE

[75] Inventor: Ernst Holmér, Göteborg, Sweden

[73] Assignee: AB Volvo, Goteborg, Sweden

[21] Appl. No.: 885,708

[22] Filed: Jul. 15, 1986

[30] Foreign Application Priority Data

Jul. 18, 1985 [SE] Sweden .................................. 8503517

[51] Int. Cl.$^4$ ................................................. F01L 1/08
[52] U.S. Cl. ................................................. 123/90.6
[58] Field of Search ............... 123/316, 90.6, 568, 123/569; 60/324

[56] References Cited

U.S. PATENT DOCUMENTS

| | | | |
|---|---|---|---|
| 1,952,881 | 3/1934 | Minter | 123/568 |
| 2,344,993 | 3/1944 | Lysholm | 123/316 X |
| 2,817,322 | 12/1957 | Miller | 123/316 |
| 3,015,934 | 1/1962 | Miller | 123/316 X |
| 4,424,790 | 1/1984 | Curtil | 123/90.6 X |

FOREIGN PATENT DOCUMENTS

| | | |
|---|---|---|
| 0015791 | 9/1980 | European Pat. Off. . |
| 0075502 | 3/1983 | European Pat. Off. . |
| 0566592 | 12/1932 | Fed. Rep. of Germany . |
| 0712976 | 5/1937 | France . |
| 0171011 | 10/1982 | Japan .................................. 123/316 |
| 0712613 | 7/1954 | United Kingdom ................. 123/316 |

Primary Examiner—Willis R. Wolfe, Jr.
Attorney, Agent, or Firm—Young & Thompson

[57] ABSTRACT

A method for controlling the working cycle of a four-stroke internal combustion piston engine with supercharging and direct fuel injection into each cylinder and with at least one inlet valve and one exhaust valve for each cylinder. The method involves opening the exhaust valve for a second time during each working cycle, in addition to holding the valve open during the exhaust expulsion stroke. According to the invention the exhaust valve is opened and closed for the second time during the compression stroke, the valve being opened when the piston is located in a first predetermined position at a distance form the lower dead center piston position and being closed when the piston is located in a second predetermined position at a distance from the lower dead center piston position greater than the first predetermined position. The inlet valve is closed during the inlet stroke, so that expansion of the air in the cylinder at full load subsequent to closing the valve is effected to or beneath the pressure in the exhaust system.

5 Claims, 4 Drawing Sheets

METHOD FOR CONTROLLING THE WORKING CYCLE OF AN INTERNAL COMBUSTION ENGINE

The present invention relates to a method for controlling the working cycle of a four-stroke internal combustion piston engine with supercharging and direct fuel injection into each cylinder, where each cylinder incorporates at least one inlet valve and one exhaust valve, the method in respect of each cylinder comprising opening the exhaust valve for a second time during each working cycle, in addition to holding the valve open during the exhaust scavenging stroke.

The internal combustion piston engine has, over the years, been developed into a highly reliable power source, the most efficient piston engine of this kind being the diesel engine. In recent decades endeavours have been made to develop the diesel engine to enable it to meet the competition of the Otto-cycle engine with respect to the relationship between weight and power output and with regard to installation volume. In more recent years progressively higher demands have been placed on sound level and the emission of exhaust gases. These demands will become still greater in the future and constitute a threat to the continued use of diesel engines in automotive vehicles The exhaust gases with their hazardous constituent content are generated by combustion of fuel in the engine Consequently, an effort should be made to consume less fuel with the engine output unchanged, i.e. higher thermal efficiency, and to effect the combustion process at the lowest possible temperature, in order to reduce the emission of nitrogen oxides in the exhaust gases at low engine loads.

Supercharging has been used for many years for the purpose of increasing the power output of internal combustion piston engines of a given size. Supercharging involves, practically exclusively, the use of turbocompressors with a turbine which is driven by the engine exhaust gases and which in turn drives a compressor for delivering air under overpressure to the inlet of the internal combustion engine. The demand for progressively higher power outputs has been met by using progressively higher supercharging pressures, which with the highly efficient turbocompressors of modern times gives a much higher pressure in the engine inlet system than in the exhaust system. This difference in pressure increases with increasing load, i.e. with increasing exhaust temperatures. This is accentuated still further at high supercharging pressures, when supercharging is applied in accordance with the constant-pressure principle. The pressure pulses in the exhaust system are thereby small.

Attempts to achieve higher thermal efficiencies have already been made. Rudolf Diesel himself envisaged complete expansion during the power or working stroke and expulsion of the exhaust gases at constant pressure This was pursued by Atkinson. The theoretical thermal efficiency of the Atkinson cycle is approximately 25% higher than the efficiency of the cycle process used today, in which when the exhaust valve is opened the exhaust gases have a relatively high pressure and give rise to a reduction in pressure in the cycle at constant volume. In the case of supercharged engines it is endeavoured to permit expansion to continue in the turbocompressor to the greatest possible extent, which if it were possible to achieve without losses would result in a common efficiency for internal combustion piston engine and turbine equal to the efficiency of the Atkinson cycle. This cannot be fully achieved in practice, inter alia because initially the exhaust flow across the exhaust valve is effected at critical flow, although an improved efficiency is obtained. One drawback with the Atkinson cycle is that the energy developed during a working cycle is so small that the desired thermal efficiency is counteracted by a lowering in the mechanical efficiency. The Atkinson cycle has therefore been less attractive hitherto from the aspect of practical application.

The rapid development of turbocompressors for supercharging internal combustion piston engines has made it possible to supercharge at such high supercharging pressures as to render them unusable in known engines in view of the demands placed on their durability and reliability. These high supercharging pressures, however, would increase the energy efficiency in the Atkinson cycle. This means that the high thermodynamic efficiency would be less affected by the frictional losses, so as to obtain a higher overall efficiency.

It has previously been suggested that the maximum power output of the internal combustion engine can be raised and the working conditions for the turbocompressor improved by opening the exhaust valve twice during each working cycle, the exhaust valve being opened for the second time during the latter stage of the engine inlet cycle. Such a proposal is made, for example, in EP-Al-No. 0 075 502. In this case the exhaust valve is open when the piston is located in its lower dead centre position during the inlet stroke, so that air from the cylinder flows out into the exhaust system, to increase the amount of gas to the turbocompressor.

In distinction hereto the object of the present invention is to provide a method of the kind described in the introduction which will enable high thermal efficiency of the engine to be achieved, i.e. low specific fuel consumption, while maintaining a high engine output at the same time. This object is achieved in accordance with the invention by opening and closing the exhaust valve for the second time during the compression stroke, the valve being opened when the piston is located in a first predetermined position distanced from the lower dead centre position of the piston, and said valve being closed when the piston is located in a second predetermined position at a further distance from the lower dead centre piston position than the first predetermined position.

The invention will now be described briefly and in more detail with reference to the accompanying drawings, in which FIG. 1 is a schematic PV-diagram relating to an internal combustion piston engine, in which diagram the cycle for a diesel engine is shown in broken lines and the Atkinson cycle is shown in full lines;

Figure 1:
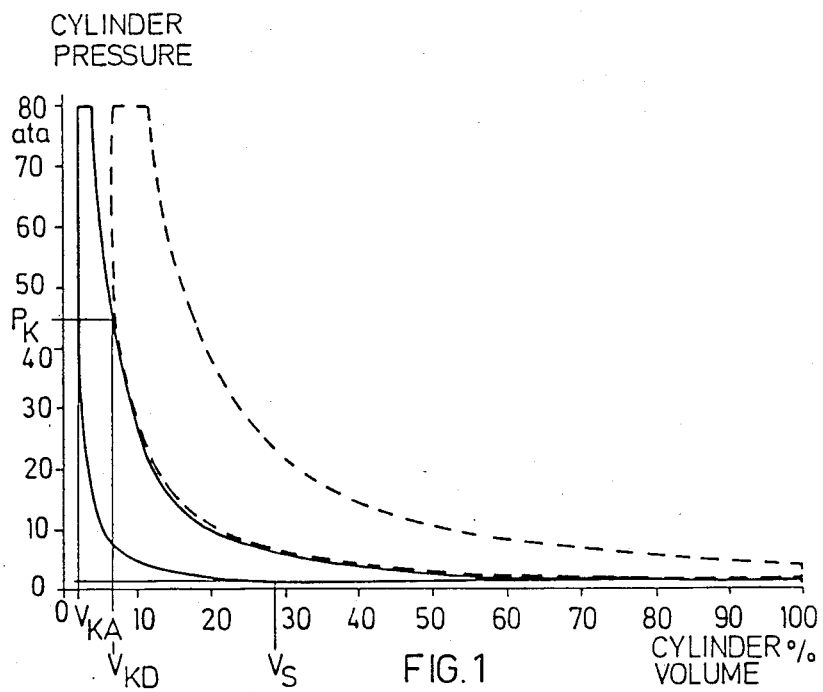

FIG. 1 illustrates schematically the working cycle of an engine employing the traditional diesel cycle (in broken lines) and an engine which works in accordance with the Atkinson cycle (full lines) It will be seen from the Figure that the Atkinson cycle assumes complete expansion during a power stroke, whereas the diesel cycle does not result in complete expansion, but that the exhaust gases have a residual pressure when the outlet valve is opened in the lower dead centre position of the piston, so that a constant volume expansion occurs at the lower dead centre position of the piston It will also be seen from the Figure that in the Atkinson cycle the inlet valve is open during a part of the compression stroke up to the point $V_S$, at which the inlet valve closes and compression is commenced Compression then continues up to the point $V_{KA}$, at which the compression pressure $P_K$ is reached. The same compression pressure is obtained in the diesel cycle, by commencing compression when the piston is in its lower dead centre position, the compression pressure being reached at the point $V_{KD}$.

Figure 2:
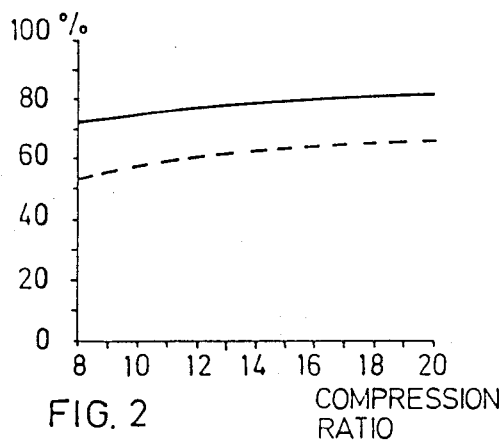
FIG. 2 is a diagram illustrating the theoretical efficiency of the cycles shown in FIG. 1 as a function of the compression ratio.

FIG. 1 shows that the useful energy during one working cycle in the Atkinson cycle is far lower than that in the diesel cycle. However, it will be seen from FIG. 2 that the theoretic efficiency of the Atkinson cycle (full line) is much greater than the efficiency of the diesel cycle (broken line).

Figure 3:
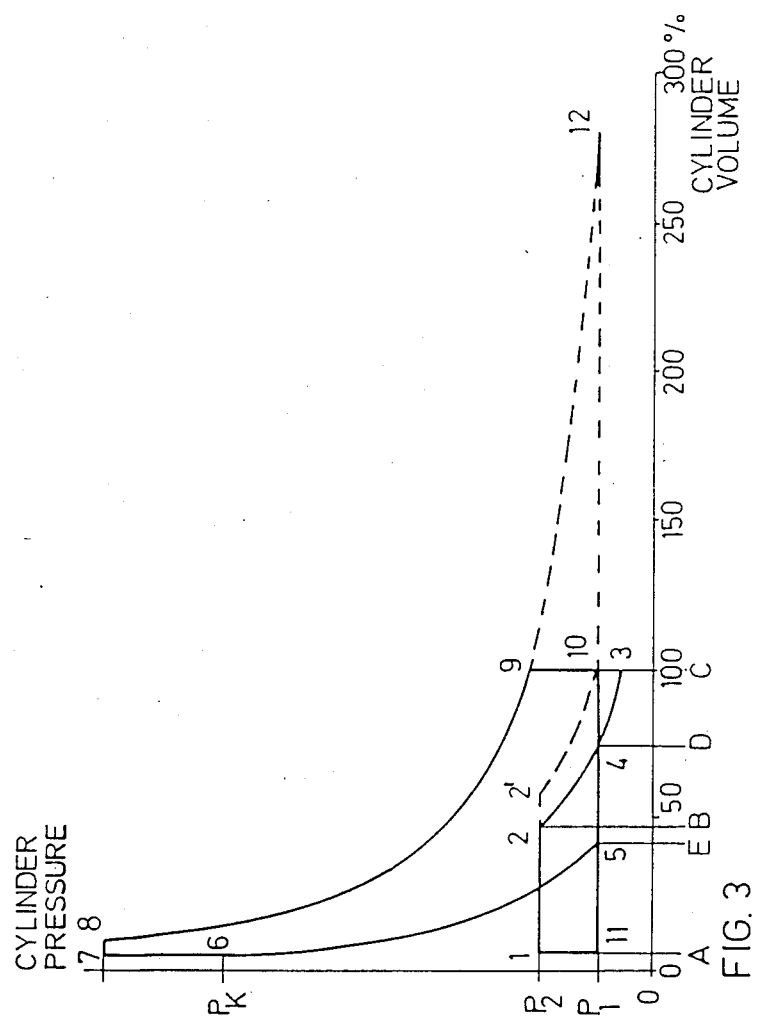
FIG. 3 is a schematic PV-diagram relating to an internal combustion piston engine utilizing the method according to the invention, the diagram illustrating the conditions prevailing at full engine load.

FIG. 3 illustrates the working cycle of a four stroke internal combustion piston engine with supercharger and of the diesel type, this working cycle being controlled in accordance with the invention. The diagram illustrates the conditions prevailing at maximum engine load. At the beginning of the inlet stroke, the inlet valve is open and air at supercharged pressure $P_2$ flows into the cylinder during movement of the piston from position A to position B, the line 1-2. The inlet valve closes at position B, i.e. at point 2. As the piston continues to move to its lower dead center position C, the air in the cylinder expands adiabatically, the line 2-3.

Upon continued movement of the piston, i.e. during its compression stroke, there first occurs an adiabatic compression, the line 3-4. When the piston is located in position D, i.e. at point 4, the exhaust valve opens, whereafter air at pressure $P_1$, which in this case corresponds to the pressure in the exhaust system, is forced from the cylinder during movement of the piston to position E, the line 4-5. The exhaust valve recloses at position E, whereafter the air present in the cylinder is compressed during the continued movement of the piston to its upper dead centre position A, the line 5-6. The compression pressure $P_K$ is reached at position A, i.e. at point 6.

Subsequent to injection of fuel and igniting the fuel in the cylinder at the upper dead centre position A of the piston, line 6-7, and subsequent to combustion at constant pressure, line 7-8, an expansion takes place during the working or power stroke, line 8-9. When the piston has reached its lower dead centre position C, i.e. point 9, the exhaust valve opens and a decrease in pressure takes place at constant volume, line 9-10.

Complete expansion of the exhaust gases would have resulted in a cycle according to broken lines 9-12-10. The corresponding energy is now utilized in the turbine of the turbocompressor instead.

The exhaust gases are dispelled from the cylinder during passage of the piston from its lower dead centre position C to its upper dead centre position A, the line 10-11. The exhaust valve is then closed and the inlet valve opened, which results in an increase in pressure, line 11-1. The working cycle is then completed and a new working cycle commenced.

The aforedescribed working cycle applies to an engine at full load. In this case, the pressure $P_1$ prevails in the engine exhaust system, while the supercharging pressure $P_2$ prevails in the engine inlet system. Due to the second opening of the exhaust valve of the engine the pressure of the gas present in the cylinder upon commencement of the actual compression process, the line 5-6, will be held substantially equal to the pressure $P_1$ in the exhaust system. Consequently, differing pressures in the exhaust system will result in variation of the pressure in the cylinder at the beginning of the compression process, which means that the compression pressure $P_K$ will also vary. The compression pressure can therefore be readily changed by changing the pressure in the exhaust system, e.g. by throttling the exhaust system to varying extents.

In addition, when designing the engine, the position E of the piston at the second time of closing the exhaust valve, i.e. point 5, can be so selected in relation to the lower dead centre point C of the piston that for optimal efficiency the energy supplied through the fuel after combustion affords a pressure of such magnitude that when the exhaust valve is subsequently opened after the working or power stroke, point 9, the exhaust gases across the exhaust valve obtain a flow velocity corresponding substantially to critical flow. However, this is not a criterion for carrying out the process, but is merely a recommendation for achieving maximum possible efficiency, by preventing hypercritical flow.

Because it is the pressure $P_1$ in the engine exhaust system which governs the starting pressure at the commencement of the compression process, point 5, the level of pressure has been lowered and the ratio between the highest pressure, determined by the construction of the engine, and the lowest pressure has increased. The efficiency of the process is thereby increased, either by being able to select a higher compression ratio or by being able to supply a larger amount of energy at constant volume, the line 6-7. In addition the temperature will be lowered, which results in a lower oxide of nitrogen content in the exhaust gases.

The sectional area 1,2,4,11,1 in the diagram of FIG. 3 represents the surplus energy delivered by the turbocompressor. The configuration of this area is determined by the time at which the inlet valve is closed, point 2. The latest possible time for closing the inlet valve, referenced 2' in the diagram, is when the subsequent adiabatic expansion lowers the pressure to the pressure level $P_1$, the line 2'-10. In this instance the points 3, 10 and 4 coincide. If the inlet valve is closed at a later point in time, the cylinder pressure, when the exhaust valve is opened, will exceed the pressure in the exhaust system. Although this is followed by expansion in the turbocompressor, this expansion results in a far lower efficiency than expansion in the cylinder.

In addition, when the process of compression is commenced at point 5 at the same pressure $P_1$ as that prevailing in the exhaust system, it is no longer necessary to apply variable compression, e.g. with the aid of telescopic pistons or the like, since there is a far smaller increase in the pressure in the exhaust system with increasing loads than in the pressure in the inlet system.

The earliest time at which the inlet valve can be closed is determined by the requirement of a space for the expulsion of air from the cylinder to the outlet system during movement of the piston from the position D to the position E. The air released into the exhaust system between position D and position E, line 4-5, does not take part in the combustion process, but passes through the cylinder. This air effectively cools the cylinder, inter alia due to the low temperature of the air resulting from the expansion which takes place along the line 2-3. The temperature of the air is also low during expulsion of the air as the piston moves from position D to position E, line 4-5, thereby effectively cooling the exhaust valve.

Another condition for a suitable inlet-valve closing time may be the desire to reduce the requirement for external cooling and replace the same with internal cooling, and to increase the overall efficiency by eliminating or reducing the need of a cooling fan. This may justify closure of the inlet valve at a point in time later than the position E, in order to increase the volume of cooling air flowing through the cylinder.

The cooling air will be located in the exhaust system in the close proximity of the exhaust valve when this valve opens after the working stroke, point 9. Consequently, sound will travel at a much lower velocity in the exhaust system, than in the gas flowing over the exhaust valve. The air therewith forms a cold plug and lowers the velocity over the exhaust valve. This enables a higher ratio between the pressure at point 9 and the pressure at point 10 to be permitted before critical flow occurs. This can therewith be utilized to determine the position E at which the exhaust valve is closed for said second time.

The greater the pressure differential between the pressure $P_2$ in the inlet system and the pressure $P_1$ in the exhaust system, the greater the quantity of cooling air passing through the engine. Consequently, the engine obtains an internal throughflow of cooling air which is dependent on load, thereby avoiding the risk of excessive cooling at low loads.

Figure 4:
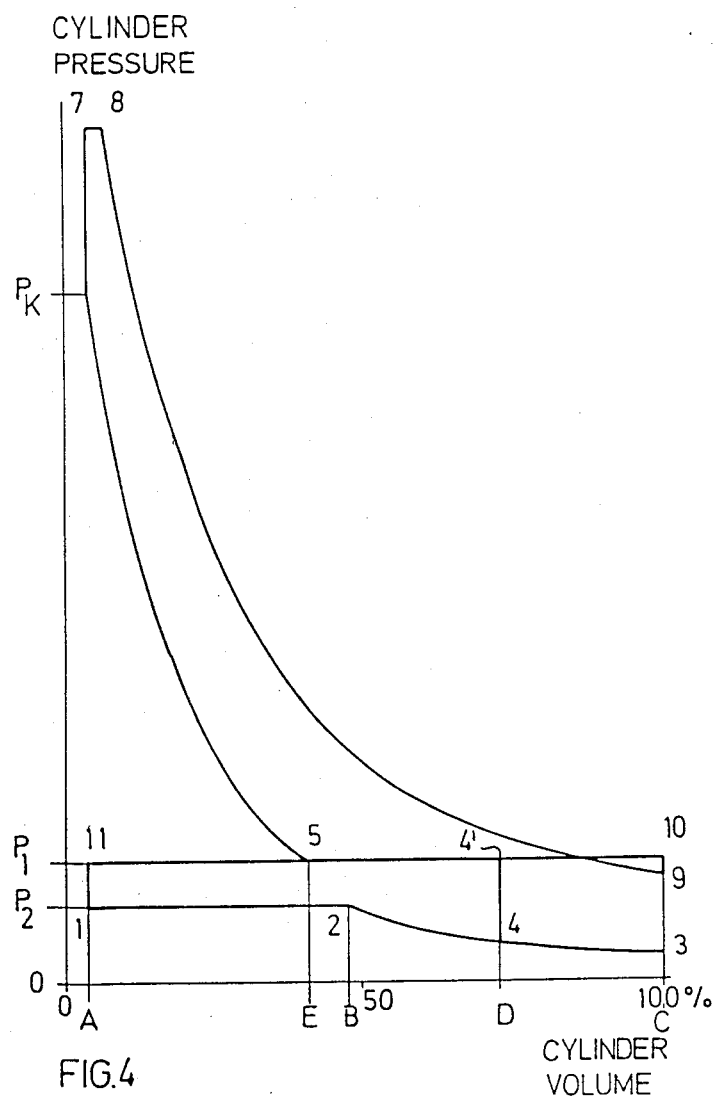
FIG. 4 is a schematic PV-diagram corresponding to the diagram of FIG. 3 but illustrating the conditions which prevail at low engine loads.

FIG. 4 is a diagram which corresponds to the diagram of FIG. 3 but relates to the conditions prevailing at low engine loads. The various points on the curve in the diagram have the same reference symbols as those used in FIG. 3. As will be seen from FIG. 4, the supercharging pressure $P_2$ is, in this case, lower than the pressure $P_1$ in the exhaust system. This means that a certain amount of exhaust gas back-flow from the exhaust system to the cylinder, line 4-4', is experienced when the exhaust valve is opened for the second time, i.e. in position D. This means that the cylinder is heated as a result of the exhaust gases taking part in the combustion process, which facilitates ignition when starting the engine and accelerates heating of the engine once the engine is started, and which also reduces the emission of hydrocarbons at low engine loads.

Since the inlet valve closes at or close to the point at which the piston reaches its highest speed in its downward travel, the volumetric efficiency will be greatly influenced by the throttling effect across the inlet valve. In this connection, volumetric efficiency is calculated as being the measured quantity of air supplied to the engine divided by that part of the stroke length incorporated from the upper dead centre piston position A to the position B at which the inlet valve closes, multiplied by the pressure difference over the turbocompressor. The amount of air in the cylinder is determined by the position E, i.e. the time at which the exhaust valve is closed, point 5. Thus, an impaired volumetric efficiency has no influence on the amount of air in the cylinder during the actual compression stroke, but only on the amount of cooling air through the engine.

Figure 5:
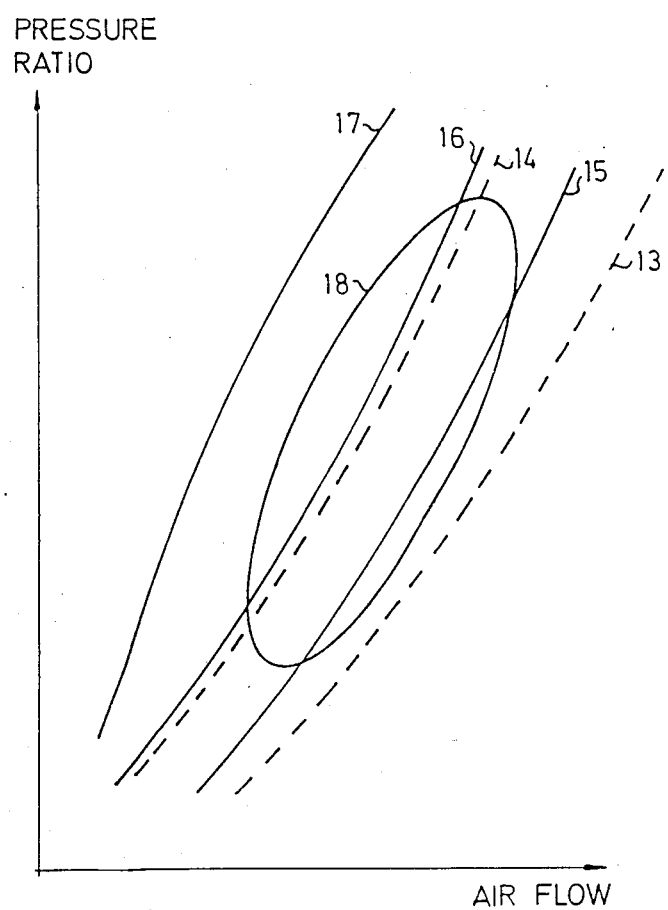
FIG. 5 is a schematic diagram illustrating the pressure ratio of the turbocompressor as a function of the air flow at different engine loads.

The above circumstance can be utilized to extend the speed range of the engine without the air-quantity curves as a function of load falling outside the range of maximum turbocompressor efficiency. In order to achieve this, the throttling losses over the inlet valve are adjusted by reducing the lifting height of the valve and/or reducing the diameter of the valve. This effect is illustrated in the diagram of FIG. 5. In this diagram the curves 13 and 14 relate to the conditions which prevail with low throttling across the inlet valve at high engine speeds and at low engine speeds respectively, whereas the curves 15 and 16 relate to the conditions which prevail when throttling across the inlet valve at high engine speeds and at low engine speeds respectively. The curve 17 illustrates the pump limit of the turbocompressor, while the curve 18 denotes the area of maximum turbocompressor efficiency. Thus, as seen from FIG. 5, a greater part of the curves can be placed within the area of maximum compressor efficiency by applying a throttle across the inlet valve. The throttling loss obtained across the inlet valve is therewith more than well compensated for by the increase in compressor efficiency.

The method according to the invention is primarily intended for a diesel type four-stroke internal combustion piston engine with high supercharging, although the method can also be applied at lower degrees of supercharging and with spark-ignition engines, although in this case, however, the fuel must be injected directly into the cylinder and measures must be taken to ensure that the fuel is mixed satisfactorily with the air prior to ignition, e.g. by air rotation and/or induced turbulence through suitable construction of the combustion chamber.

It will be understood that the invention is not restricted to the aforedescribed embodiment, but that modifications can be made within the scope of the following claims.

I claim:

1. A method for controlling the working cycle of a four-stroke internal combustion piston engine with supercharging and direct fuel injection into each cylinder, where each cylinder presents at least one inlet valve and one exhaust valve, which method requires the exhaust valve of each cylinder to be opened a second time during each working cycle in addition to being held open during the exhaust scavenging stroke, characterized by opening and closing the exhaust valve for this second time during the compression stroke, and expelling gas from each cylinder through said exhaust valve throughout said second time, the exhaust valve being opened after commencement of the compression stroke when the piston is located in a first predetermined position distance from the lower dead center piston position, and closure of the exhaust valve taking place prior to completion of the compression stroke when the piston is located in a second predetermined position at a further distance from the lower dead centre piston position than the first predetermined position.

2. A method according to claim 1, characterized by opening the inlet valve subsequent to closure of the exhaust valve when the piston is located in the vicinity of its upper dead centre position after the exhaust gas scavenging stroke; and by closing the inlet valve during the inlet stroke when the piston is located in a third predetermined position distanced from the upper dead centre position of the piston.

3. A method according to claim 1, characterized by closing the exhaust valve for the second time in the second predetermined position of the piston in a manner such that, for best efficiency, the energy obtained through combustion of the fuel provides a pressure which upon the subsequent opening of the exhaust valve after the working stroke imparts to the exhaust gases a flow velocity which lies close to the boundary for critical flow.

4. A method according to claim 1, characterized in that the pressure in the exhaust system is adjusted by throttling the exhaust flow so as to change the compression pressure attained at the end of the compression stroke.

5. A method according to claim 1, characterized by adjusting the throttling effect across the inlet valve so that within a predetermined engine speed range the air flow lies within the region of the best efficiency of the turbocompressor.

* * * * *